United States Patent [19]

Noland

[11] 4,271,899
[45] Jun. 9, 1981

[54] HEAT PUMP CONTROL SYSTEM

[75] Inventor: Joseph R. Noland, Crestwood, Ky.

[73] Assignee: General Electric Company, Louisville, Ky.

[21] Appl. No.: 134,355

[22] Filed: Mar. 27, 1980

[51] Int. Cl.³ .................. F25B 29/00; F25D 21/02
[52] U.S. Cl. .................................. 165/29; 62/156; 62/160
[58] Field of Search ............... 165/28, 29, 17, 27; 62/156, 160; 219/485, 486, 487

[56] References Cited

U.S. PATENT DOCUMENTS

| | | | |
|---|---|---|---|
| 3,131,549 | 5/1964 | Rhea | 62/228 |
| 3,159,981 | 12/1964 | Huskey | 62/156 |
| 3,348,607 | 10/1967 | Cootey | 165/28 |
| 3,447,335 | 6/1969 | Ruff et al. | 62/159 |
| 3,466,888 | 9/1969 | Kyle | 62/156 |
| 3,474,639 | 10/1969 | Smith | 62/160 |
| 3,529,659 | 9/1970 | Trask | 165/29 |
| 4,024,722 | 5/1977 | McCarty | 62/81 |
| 4,102,391 | 7/1978 | Noland et al. | 165/29 |

Primary Examiner—Albert W. Davis
Assistant Examiner—Margaret A. Focarino
Attorney, Agent, or Firm—Frank P. Giacalone; Radford M. Reams

[57] ABSTRACT

The present invention relates to a self-contained air conditioning unit including a reversible refrigeration system and more particularly to a control system having a plurality of sensing means that are effective in maintaining operation of the unit in a heat mode by use of a supplemental heater when the ambient and the surface temperature of selected refrigeration components are above a preselected frosting temperature, and a secondary heater when the system is in a defrost mode.

1 Claim, 2 Drawing Figures

HEAT PUMP CONTROL SYSTEM

BACKGROUND OF THE INVENTION

Self-contained air conditioning units of the reversible type which are adapted to be mounted in the outer wall of an enclosure and utilized for heating the air from the enclosure during the winter and cooling the air from the enclosure during the summer comprises a housing divided into an indoor section and an outdoor section. An indoor heat exchanger is disposed in the indoor section while an outdoor heat exchanger and usually the compressor are located in the outdoor section. The compressor is reversibly connected to the heat exchangers so that the indoor heat exchanger functions as an evaporator when the unit is operating on the cooling cycle and the outdoor heat exchanger functions as the evaporator on the heating cycle. Suitable independent fan means are provided for circulating indoor air over the indoor heat exchanger and outdoor air over the outdoor heat exchanger during operation of the system on either the heating or cooling cycle.

Under certain operating conditions, the outdoor heat exchanger functioning as the evaporator may operate at such a low temperature as to cause the accumulation of a coating or layer of frost thereon. Since such a frost layer operates as a barrier to heat transfer between the evaporator and the air being circulated over the evaporator, the efficiency of the unit is markedly reduced. Also, unless means are provided for interrupting this accumulation of frost, the evaporator can become completely filled with a layer of frost which may eventually cause motor or other damage to the unit.

U.S. Pat. No. 4,024,722-McCarty, assigned to the General Electric Company, assignee of the present invention, discloses a heat pump control circuitry including a pair of thermostats comprising sensing elements subjected to both ambient and selected component surface temperatures whereby the operation of the heat pump is maintained as long as the temperature sensed by the thermostat is above a preselected frosting level and is interrupted by the coldest preselected temperature sensed by the elements.

U.S. Pat. No. 3,159,981-Huskey, assigned to the General Electric Company, assignee of the present invention, discloses a self-contained air conditioning unit including a reversible refrigeration system and a control circuitry designed to interrupt the operation of the refrigeration system whenever either the outdoor or indoor heat exchanger attains a frosting temperature and to supply auxiliary heat to an enclosure whenever the operation of the refrigeration system is thus interrupted during a heating cycle. The frost control switch includes a vapor-filled bellows and capillary tube sensing element connected to the bellows. The tube is arranged with a first portion in contact with one of the heat exchangers and a second portion in contact with the other heat exchanger whereby the bellows-operated switch will stop the compressor when either heat exchanger attains a frosting temperature.

Another prior art attempt at solving the frosting of the outdoor heat exchanger when in the heating cycle it is operating as an evaporator, is disclosed in U.S. Pat. No. 3,466,888-Kyle. The control circuitry includes a first thermistor in heat exchange contact with the outdoor coil and a second thermistor is exposed to the temperature of the outdoor air. The two thermistors are connected in series. When frost forms on the surface of the outdoor heat exchanger, the temperature of the refrigerant therein decreases, and the voltage at the junction of the thermistor changes, and operates a control circuit which stops the fan of the outdoor coil, and reverses the flow of refrigerant so that the outdoor coil operates as a condenser coil to melt the frost.

U.S. Pat. No. 3,348,607-Cootey discloses a split-bulb or dual-bulb thermostat wherein a sensing element is located in the path of return air and the other in the outdoor or ambient air. The sensing elements are proportioned in size relative to each other and both elements transmit motion to a single power element in response to changes in the temperature of the air effecting the elements.

SUMMARY OF THE INVENTION

The present invention is an improvement of the control system disclosed in U.S. Pat. No. 4,102,391-Noland et al, assigned to the General Electric Company, the assignee of the present invention, and relates to a self-contained air conditioning units for heating and cooling and enclosure and, more particularly, for controlling the air conditioning unit in the heating mode. The refrigeration system includes an outdoor heat exchanger, an indoor heat exchanger, a compressor, a valve for selectively connecting the compressor to the heat exchangers whereby the outdoor heat exchanger functions as an evaporator during operation of the unit on the heating cycle and the indoor heat exchanger functions as an evaporator during operation of the unit in the cooling cycle, and air circulating fans including a fan for moving enclosure air through the indoor heat exchangers and a fan for moving outdoor ambient air through the outdoor heat exchanger.

The present control system includes supplemental and secondary heaters that are arranged in the air discharge side of the indoor heat exchanger. An enclosure ambient sensing thermostat having a first-stage switch operable for controlling the operation of the compressor in the heating cycle for maintaining the temperature of the enclosure within a selected temperature range, and second-stage switch operable when the temperature of the enclosure drops below the selected range for energizing the supplemental heater while the compressor is operating through the first-stage switch.

A first control is provided including a sensing element having one portion exposed to the surface temperature of the outdoor heat exchanger and a second portion exposed to the drain area temperature. The sensing element is operatively connected with a switch including a first contact for maintaining operation of the compressor in the heating cycle when both the drain area and surface temperature of the heat exchange surfaces are above a preselected frost accumulation level and a second contact operable when the element senses a preselected frost accumulation level to de-energize the compressor and energizing the secondary heater through the first-stage thermostat switch so that the temperature of the air passing through the indoor heat exchanger is maintained at a preselected temperature when the compressor is de-energized during the defrosting of the outdoor heat exchanger.

A second control is provided including a sensing element having one portion exposed to the surface temperature of a portion of the refrigerant circuit and a second portion exposed to said ambient outdoor temperature. The second control includes a switch operatively connected to the sensing elements for maintaining operation of the outdoor fan independent of the first control when the temperature sensed by the sensing element is above a frost accumulation temperature and to complete a circuit to said fan through said first control if the sensing element senses a preselected frosting temperature to de-energize the outdoor fan when the compressor is de-energized.

DESCRIPTION OF THE PREFERRED EMBODIMENT

Figure 1:
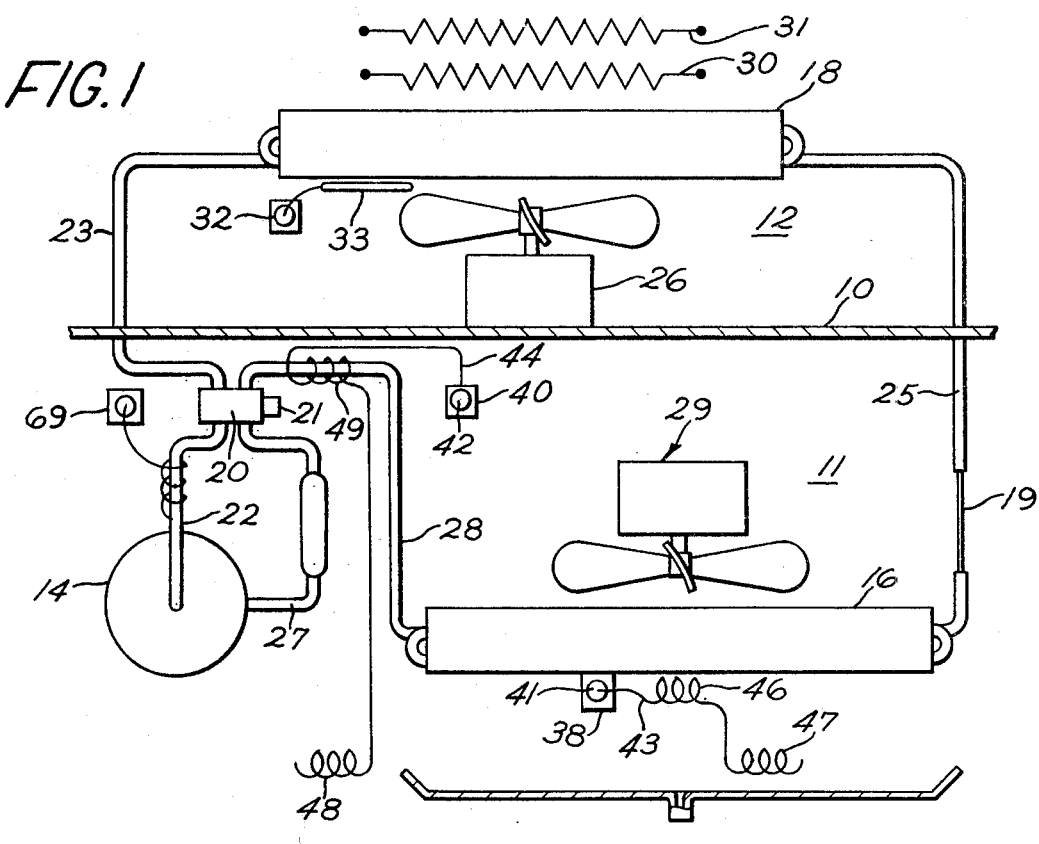
FIG. 1 is a diagrammatic view of a self-contained heat pump air conditioner unit embodying this invention.

Referring to FIG. 1 of the drawing, there is shown schematically an air conditioning refrigeration system of the reversible or heat pump type divided by means of a partition 10 into an outdoor section 11 and an indoor section 12. A reverse cycle refrigeration system comprises a compressor 14 and an outdoor heat exchanger 16 mounted within the outdoor section 11 and an indoor heat exchanger 18 mounted within the indoor section 12. The outdoor heat exchanger 16 and indoor heat exchanger 18 are connected by means of a suitable flow restriction means such as a capillary tube 19 while compressor is connected to the heat exchangers through a reversing valve 20 operated by a solenoid 21 so that the indoor heat exchanger 18 can be connected to the compressor either as an evaporator or as the condenser component of a refrigeration system.

During operation of the system as a heat pump or in the heating cycle, the reversing valve 20 directs the flow of high temperature refrigerant gas from the discharge line 22 of compressor 14 through a line 23 into the indoor heat exchanger 18 which then functions as a condenser to warm the air to be conditioned, and to condense the refrigerant gas into liquid form. The refrigerant is partially or completely condensed by the air circulated through the indoor heat exchanger 18 by fan 26. The refrigerant then flows through line 25 including expansion device 19 to the outdoor heat exchanger which is now functioning as an evaporator and then back through valve 20, suction line 27, and into the compressor 14.

During operation of the system in the cooling cycle, high pressure refrigerant gas is directed by the reversing valve 20 into the outdoor heat exchanger 16 through a line 28 where the high pressure refrigerant gas is condensed by the air circulated through heat exchanger 16 by fan 29. The refrigerant then flows through line 25 including expansion device 19 to the indoor heat exchanger 18 which is now functioning as an evaporator and then back through line 23, valve 20, suction line 27 and into the compressor 14.

Auxiliary heaters in the form of electrical resistance heaters 30,31 are preferably provided in the indoor section 12 in the path of air flowing through the indoor heat exchanger 18 for the purpose of supplying heat to the airstream under certain operating conditions when heat supplied by the indoor heat exchanger 18 operating as a condenser cannot satisfactorily maintain the enclosure being heated at a preselected temperature, and when the compressor is de-energized as for example as will be explained in detail during a defrosting of the outdoor heat exchanger 16.

Positioned within the unit at some point in the airstream upstream from the heat exchanger 18 is a staged thermostat 32 which controls the operation of the unit on either the heating or the cooling cycle. This thermostat 32 is of the type well known in the art and, as employed in the present embodiment of the invention, includes sensing means 33 responsive to the temperature of the indoor air for actuating a first-stage switching means 57 and a second-stage switching means 58 in the control circuit in a manner to be fully explained hereinafter. In the illustrated embodiment of the invention, this temperature responsive means 33 is arranged in the airstream flowing from the enclosure and into the indoor section. The unit is also provided with a main or selector 34 (FIG. 2) through which electrical supply from supply lines 36–37 is connected to the unit and by means of which the operator of the unit may select operation thereof of the unit on either the heating or the cooling cycle.

In accordance with the present invention, the unit also includes a pair of frost control thermostats or switches 38 and 40 which may be conveniently mounted on the outdoor section 11 and which are activated by a vapor-filled bellows 41,42 respectively, and include capillary tube sensing elements 43,44 connected to the bellows 41,42 respectively.

The sensing element 43 of switch 38 is arranged to maintain operation of the refrigeration system compressor 14 energized in the heat pump mode when both the drain area and surface temperature of heat exchanger 16 are both above a preselected frost accumulation level, and to interrupt the operation of the compressor 14 and energize heater 30 whenever either heat exchanger 16 or the drain area temperature indicates an excessive frosting condition or temperature during operating of the unit on the heating cycle. To this end, the capillary sensing element 43 is arranged so that it includes a first portion 46 which continuously senses the temperature of the outdoor heat exchanger 16 and a second portion 47 which continuously senses the drain area temperature, and more particularly the presence of ice.

The sensing element 44 of switch 40 is arranged to maintain operation of the outdoor fan motor 29 when the temperature of the relatively cold line 28 in the heating mode and the ambient outdoor temperature are both above the freezing range, and to interrupt operation of the fan 29 when either line 28 or the ambient temperature is below freezing temperature, when the unit is on in the heating cycle and control 38 has interrupted operation of the compressor 14. To this end, the capillary sensing element 44 is arranged so that it includes a first portion 48 which continuously senses the outdoor or ambient temperature and a second portion 49 which continuously senses the temperature of the line 28 adjacent the reversing valve 20.

As is well known, a vapor-filled capillary-bellows type of thermostat has the characteristic of controlling from the coldest point of the bellows-capillary system due to the fact that a vapor-liquid boundary is formed at the coldest point and this boundary establishes the vapor pressure of the capillary-bellows system. Hence, the operation of the frost control switch 38 will be controlled by either of its sensing portions 46,47 depending on which is colder, while the operation of the frost control switch 40 will be controlled by either of its sensing portions 48,49 depending on which is colder.

While in the preferred embodiment of the invention disclosed, vapor-filled capillary-bellows type thermostat controls have been used successfully, it should be understood that other controls and components may be employed that provide control from the coldest point sensed.

Generally, during repeated defrosting cycles, ice will reform in the drain area quickly since it is the last place to melt or leave the drain area. Accordingly, positioning portion 41 adjacent the drain will, since switch member 61 does not trip until 35° F. is sensed, assure that all of the ice has melted from the drain area and in fact water is running through the drain. However, it may be possible that other points or areas of the unit could provide adequate temperature readings relative to ice or frost accumulation; for example, any area where ice or frost would normally accumulate in a unit.

Figure 2:
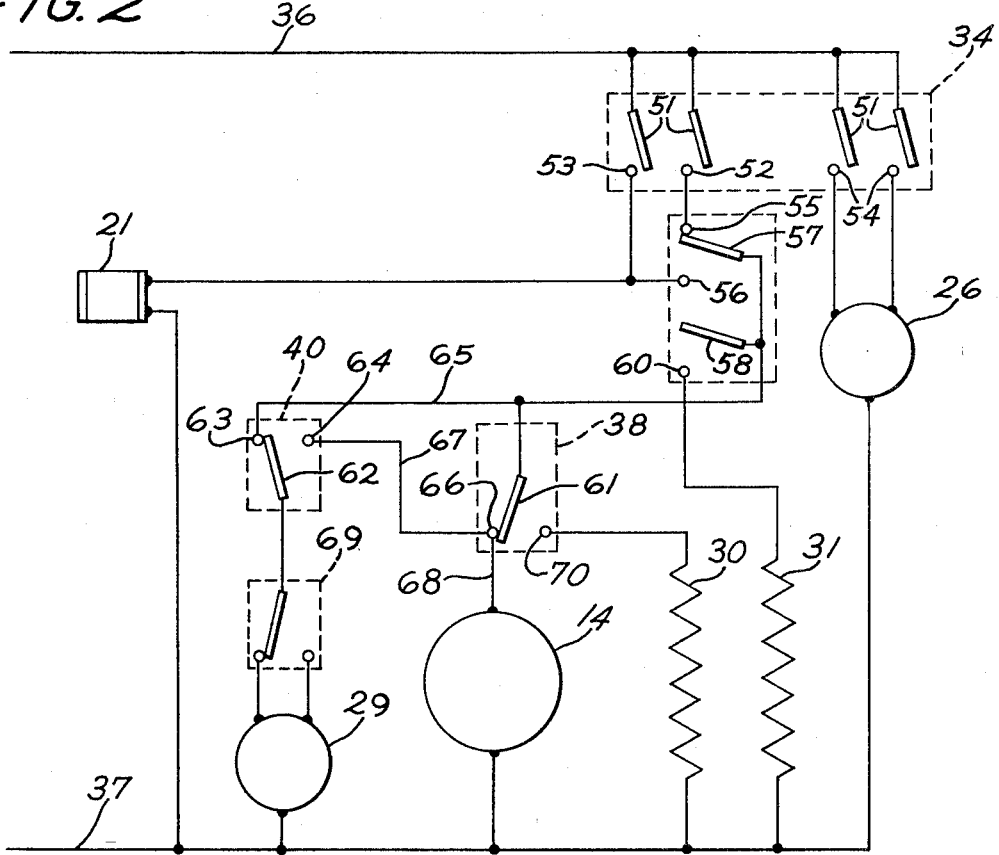
FIG. 2 is a simplified schematic diagram of electrical control circuitry adapted to control the unit in accordance with the present invention.

For a more complete understanding of the control circuitry, and the manner in which frost buildup is controlled, reference is made to the wiring diagram shown in FIG. 2 of the drawing. As mentioned hereinbefore, the main or selector switch 34 allows energization of the air conditioning unit, and selects the operation thereof on either the heating or cooling cycle. Switch 34 includes a plurality of switching means 51 movable between a cooling contact 52 and a heating contact 53 by which the operation of the unit on either the cooling cycle or the heating cycle can be selected. Switch 34 also provides a circuit through its contacts 54 to selectively operate the indoor fan motor 26 on high or low fan speed. It should be noted that the indoor fan 26 will run continuously at its preselected speed during operation of the unit on either the heating or the cooling cycle.

In operation with the selector switch 34 in the heat position, a circuit is completed from line 36 through contact 53, solenoid 21 to activate the reversing valve 20 thereby placing the refrigeration system in the heat pump mode. Cooling contact 52 and heating contact 53 of selector switch 34 are connected to cooling and heating contacts 55,56 respectively, of thermostat 32. Accordingly, the first-stage switching means 57 of thermostat 32 is arranged to supply power to the remaining control circuit through contact 55 in the cooling mode through contact 56 in the heating mode. The second-stage switching means 58 is movable relative contact 60 which completes a circuit through the supplemental heater 31 when the temperature of the enclosure being conditioned drops approximately 2° F. below the selected comfort temperature.

If the heating mode, power from supply line 36 passes through contact 56, switch means 57 of thermostat 32 and line 65 to feed the frost control thermostats 38 and 40. With regard to frost control 38, power is fed to switching member 61 which is arranged to engage contact 66 above a preselected temperature to energize the compressor 14 through line 68, and to switch over to contact 70 below a preselected temperature to energize the secondary heater 30. Power from line 65 is also fed to a contact 63 of frost control 40. The switching means 62 of control 40 controls operation of the outdoor fan motor 29 and is arranged to move between the upper temperature contact 63 and a lower temperature contact 64. Contact 64 received power from the contact 66 of control 38 through line 67.

In operation, when the drain area sensed by portion 47, and the surface temperature of heat exchanger 16 sensed by portion 46 of capillary 43 are both above a preselected upper or frost accumulation temperature, a circuit is completed through control 38, switch means 61, contact 66, line 68, and compressor 14, to energize the refrigeration system in the heat pump mode. In the event that the ambient or outdoor temperature sensed by portion 48 and the temperature of the line 28 adjacent the valve 20 sensed by portion 49 of capillary 44 are both above a preselected upper or frost producing temperature, a circuit is completed from line 65, contact 63, switch means 62, fan speed selector 69, to energize the outdoor fan motor 29. While the present embodiment of the control circuit includes a fan speed selector 69 capable of modulating between a high and low fan speed, determined by compressor outlet line temperature, it should be noted that the frost control system of the present invention is not dependent on modulating the outdoor fan speed and, accordingly, the use of a fan speed selector switch is optional.

In the event either portion 46 or 47 of capillary 43 senses a predetermined frost accumulation temperature in the heating mode, the bellows 41 will cause the switching means 61 to move from contact 66 to contact 70 to energize supplementary heater 30. The circuit to the compressor 14 will be broken, thereby de-energizing the refrigeration circuit to prevent additional frost from forming on heat exchanger 16. If, during the time the control 38 is positioned by a frosting temperature to de-energize the compressor 14, either of the portions 48, 49 of capillary 44 sense a low frost producing temperature, the bellows 42 will cause switching means 62 of switch 40 to move from contact 63 to contact 64, so that the outdoor fan will be de-energized.

It should be noted that the surface temperature of the heat exchanger 16 and line 28 adjacent the valve 20 will normally be colder than ambient when the unit is operating in the heat pump mode. Accordingly, portions 46 and 49 will sense the frost producing temperature and in effect be the controlling point. With regard to the operation of outdoor fan motor 29, the portion 49 sensing the colder temperature of line 28 has caused switching means 62 to de-energize the fan motor 29. In this situation, the relatively warm operating temperatures of the discharge line 22 of the compressor 14 will migrate or be transferred through the reversing valve 20 to the portion of the line 28 that is provided with element 49, so that the temperature sensed by portion 49 will very quickly be above the frost producing level, causing switch means 62 to switch to contact 63, provided portion 48 is above preselected temperature, and once again energize fan motor 29 to raise the temperature of heat exchanger 16 relative to ambient to eliminate any frost that may have collected on the surface of heat exchanger 16. The operation of the outdoor fan 29 at this time is beneficial in that by raising the surface temperature of the heat exchanger so that the surface temperature of heat exchanger 16 is once again above the preselected frost producing temperature, causing switch means 61 to move to contact 66 so that the compressor 14 will be energized and the refrigeration system will operate in the heat pump mode to maintain the comfort level selected by the thermostat 32. Operation of, or energization of, heater 30 is controlled by first-stage switching means 57 through its contact 56 as will be explained fully after the compressor is de-energized by control 38.

While operation of the control circuit of the present invention is controlled by the upper and lower temperature sensed by the capillaries 43 and 44, it should be noted however that the exact temperatures selected may vary depending on several factors, including geographic location of the unit and the exact location of the portions 46 and 49 relative to the refrigeration components. The frost control system of the present invention has been successfully carried out when the temperature range of control 38 was between a high of 35° F. and a low of 10° F. with a temperature swing of 25° F., and the temperature range of control 40 was between a high of 35° F., and a low of 30° F., with a temperature swing of 5° F.

The switching means 61 will complete a circuit through contact 66 when both the surface temperature of heat exchanger 16 and the ambient air are above 35° F. and will switch to contact 70 to de-energize the compressor and energize supplementary heater 30 if either gets down to 10° F., keeping in mind, however, that the surface temperature of heat exchanger 16 will be lower than ambient. With regard to switching means 62, a circuit to the fan motor 29 will be completed through contact 63 when both the surface temperature of line 28 and the ambient are above 35° F. and will switch to contact 64 if either gets down to 30° F. to de-energize the fan motor 29 only if control 38 has sensed a frost producing 10° F. temperature. If control 38 has not sensed a frost producing temperature, then the fan motor will continue to operate through line 67.

Regarding the function of the two-stage thermostat 32 when the temperature of the enclosure being heated in the heat mode reaches a predetermined comfort level, switching means 57 moves away from contact 56 to interrupt operation of the compressor. A drop in temperature causes switch member 57 to complete a circuit through contact 56 to complete a circuit through line 65, switch member 61, contact 66, to energize compressor 14. At the same time a circuit is completed through switch contact 63, member 62, to energize outdoor fan 29. A further drop in temperature will cause second-stage switch member 58 to complete a circuit through its contact 60 to energize the supplementary heater 31.

In this mode with the compressor 14 and heater 31 energized, and frost is sensed by the frost control 38, the switch member 61 will move away from contact 66 and establish a circuit through contact 70, thereby energizing secondary heater 30 so that the unit will operate with both heaters 30 and 31 during the time the compressor is de-energized.

In summary, if the refrigeration system in the heat mode cannot handle the heating load and, consequently, the enclosure temperature continues to drop, the heater 31 will be turned on through the second-stage switch 58 and will be energized together with the compressor 14 to supplement the heat pump. This control of supplemental heater 31 is significant in the operation of the unit in the heat pump mode in that it allows the compressor to operate and supply heat in combination with the heater 31 as long as a frost-producing temperature is not sensed by control 38. In the event frost control 38 contacts 61-66 open due to outdoor surface or air temperature falling below 10° F., contacts 61-70 will close to energize heater 30, together with heater 31. In another situation, for example, the frost control 38 may sense a frost condition and switch to heater 30 operation while the thermostat is still in the first-stage switch mode. In this mode if heater 30 cannot handle heat load, a fall in temperature of 2° F. will cause a circuit through switch 58-60 to energize heater 31 for operation along with heater 30. It should be noted that operation of heater 30 through the first-stage switching means of the thermostat will, in effect, provide a comfort level within the selected temperature of the thermostat since, as explained hereinbefore, the second-stage switching takes place at a 2° F. lower temperature. Accordingly, heater 30 will maintain the temperature of the enclosure during a defrost mode since it will cycle through the first-stage switch.

The following chart shows the various modes of air conditioning unit components:

| OPERATION OF UNIT IN HEAT MODE ||||||||||
|---|---|---|---|---|---|---|---|---|---|
| AMBIENT TEMP CONTROL 40 ||| SURFACE TEMP CONTROL 38 ||| THERMOSTAT || COMP | FAN MTR | HEATER | HEATER |
| 63 - | 62 - | 64 | 66 - | 61 - | 70 | SW 57 - 56 | SW 58 - 60 | 14 | 29 | 30 | 31 |
| X | | | X | | | X | | ON | ON | OFF | OFF |
| X | | | | X | | X | | OFF | ON | ON | OFF |
| | X | | X | | | X | | OFF | OFF | ON | OFF |
| X | | | X | | | X | X | ON | ON | OFF | ON |
| X | | | | X | | X | X | OFF | ON | ON | ON |
| | X | | | | | X | X | OFF | OFF | ON | ON |

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. In a self-contained air conditioning unit for heating and cooling an enclosure, a refrigerant circuit including an outdoor heat exchanger and indoor heat exchanger, a compressor, a reversing valve for selectively connecting said compressor to said heat exchangers whereby said outdoor heat exchanger functions as an evaporator during operation of said unit on the heating cycle and said indoor heat exchanger functions as an evaporator during operation of said unit on the cooling cycle, fan means for moving enclosure air through said indoor heat exchanger, fan means for moving outdoor ambient air through said outdoor heat exchanger, an air conditioner heating cycle control system comprising:
   a supplemental and secondary heat means arranged in air flow relationship with said indoor heat exchanger;
   a thermostat, including a first-stage switching means, operable for controlling operation of said compressor and said secondary heat means in said heating cycle for maintaining the temperature of said enclosure within a selected temperature range, and a second stage switching means operable when the temperature of said enclosure drops below said selected temperature range for energizing said supplemental heating means while said compressor is operating through said first-stage switching means;

a first frost control means including a sensing element having one portion being exposed to the surface temperature of said outdoor heat exchanger and a second portion being exposed to the drain area temperature, switch means under control of said portions including a first switch position for maintaining operation of said compressor in the heating cycle when drain area and said outdoor heat exchanger surface temperature sensed by said portions are above a preselected frost accumulation level and a second switch position operable when either of said portions senses a preselected frost accumulation level to de-energize said compressor and for energizing said secondary heat means through said first-stage thermostat switch means so that the temperature of air passing through said indoor heat exchanger is maintained at a preselected temperature by said secondary heat means when said compressor is de-energized; and a second frost control including a sensing element having one portion being exposed to the surface temperature of a portion of said refrigerant circuit and a second portion being exposed to said ambient outdoor temperature, switch means under control of said portions for maintaining operation of said outdoor fan independent of said first control when both ambient and the line surface temperature sensed by said portions are above a frost accumulation temperature and to complete a circuit to said fan through said first control if either of the portions of said second control senses a preselected frosting temperature to de-energize said outdoor fan when said compressor is de-energized.

* * * * *